(12) United States Patent
Meffert et al.

(10) Patent No.: US 8,420,737 B2
(45) Date of Patent: *Apr. 16, 2013

(54) METHOD FOR THE PRODUCTION OF CO-EXTRUDATES COMPOSED OF POLYSTYRENE AND OF A CROSSLINKED POLYVINYLPYRROLIDONE WITH REDUCED RESIDUAL STYRENE MONOMER CONTENT

(75) Inventors: Helmut Meffert, Bobenheim am Berg (DE); Marianna Pierobon, Ludwigshafen (DE); Ates Erk, Karlsruhe (DE); Hermann Josef Feise, Kleinniedesheim (DE); Robert Bayer, Sinsheim (DE)

(73) Assignee: BASF SE, Ludwigshafen (DE)

( * ) Notice: Subject to any disclaimer, the term of this patent is extended or adjusted under 35 U.S.C. 154(b) by 652 days.

This patent is subject to a terminal disclaimer.

(21) Appl. No.: 12/440,803

(22) PCT Filed: Sep. 10, 2007

(86) PCT No.: PCT/EP2007/059435
§ 371 (c)(1),
(2), (4) Date: Mar. 11, 2009

(87) PCT Pub. No.: WO2008/031779
PCT Pub. Date: Mar. 20, 2008

(65) Prior Publication Data
US 2009/0275691 A1 Nov. 5, 2009

(30) Foreign Application Priority Data
Sep. 12, 2006 (EP) .................... 06120536

(51) Int. Cl.
C08J 3/00 (2006.01)
C08F 8/00 (2006.01)
C08G 75/02 (2006.01)

(52) U.S. Cl.
USPC ............. 525/73; 525/55; 528/499; 528/503; 523/326; 523/328; 264/142

(58) Field of Classification Search ............... 524/516, 524/241, 577; 525/192, 205, 346, 55, 73; 525/195, 217, 241; 528/483, 499, 500, 502 R, 528/503; 523/326, 328; 264/42, 211, 142, 264/143
See application file for complete search history.

(56) References Cited

U.S. PATENT DOCUMENTS

| | | | |
|---|---|---|---|
| 2,713,043 A | 7/1955 | Daumiller | |
| 4,451,582 A | 5/1984 | Denzinger et al. | |
| 5,250,607 A * | 10/1993 | Comert et al. | 524/507 |
| 5,786,445 A | 7/1998 | Wulff et al. | |
| 6,525,156 B1 | 2/2003 | Ernst et al. | |
| 6,575,721 B1 * | 6/2003 | Daly et al. | 425/6 |
| 7,767,125 B2 * | 8/2010 | Mathauer et al. | 264/211 |
| 7,868,093 B2 * | 1/2011 | Mathauer et al. | 525/217 |
| 7,993,533 B2 * | 8/2011 | Meffert et al. | 210/797 |
| 2003/0124233 A1 * | 7/2003 | Gomez et al. | 426/422 |
| 2003/0195316 A1 | 10/2003 | Stark | |
| 2004/0094486 A1 * | 5/2004 | Drohmann et al. | 210/777 |
| 2008/0146739 A1 * | 6/2008 | Mathauer et al. | 525/192 |

FOREIGN PATENT DOCUMENTS

| | | |
|---|---|---|
| DE | 808788 | 7/1951 |
| DE | 19537114 A1 | 4/1997 |
| EP | 0088964 B1 | 9/1987 |
| EP | 0377115 A2 | 7/1990 |
| EP | 1318159 A2 | 6/2003 |
| EP | 1354900 A1 | 10/2003 |
| EP | 1861461 B1 | 12/2008 |
| JP | 2002-97362 A | 2/2002 |
| WO | WO-00/68286 A1 | 11/2000 |
| WO | WO-02/32544 A1 | 4/2002 |
| WO | WO-2006/097470 A1 | 9/2006 |

OTHER PUBLICATIONS

"Chevron Phillips EB2100 Rubber Modified Super High Impact Polystyrene." Matweb, 1996, Retrieved online[Nov. 11, 2007]. Retrieved from Online <http://www.matweb.com>.*

* cited by examiner

*Primary Examiner* — Hannah Pak
(74) *Attorney, Agent, or Firm* — Novak Druce Connolly Bove + Quigg LLP

(57) ABSTRACT

A method for removing residual styrene monomers from co-extrudates comprising polystyrene and water-insoluble, crosslinked polyvinylpyrrolidone, which comprises subjecting an aqueous suspension of the particulate solid co-extrudate to a heat treatment at temperatures of 60 to 99° C., the weight ratio of solid co-extrudate to water in the suspension being 1:1.5 to 1:20, and the concentration of the suspension being kept constant during the treatment.

9 Claims, 1 Drawing Sheet

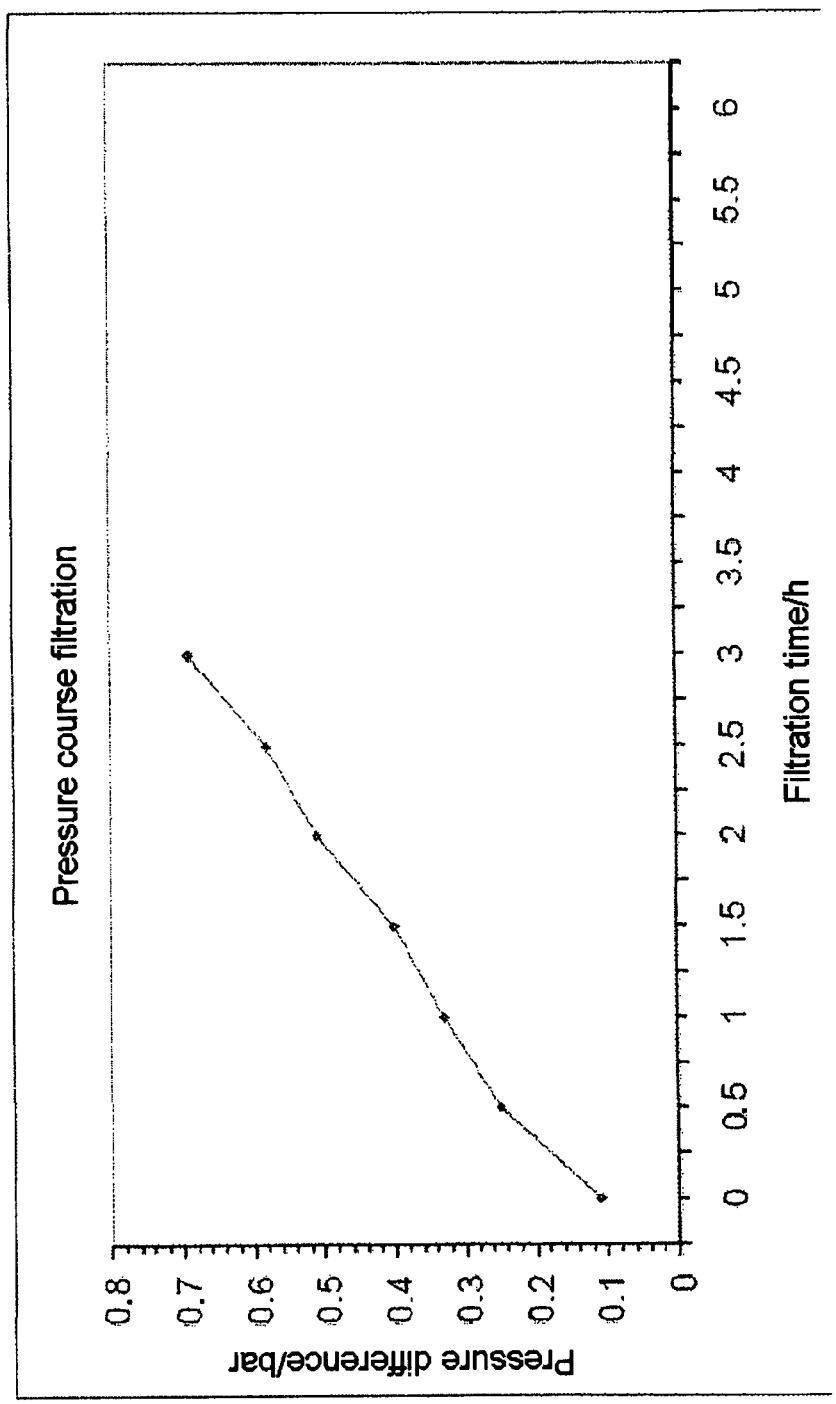

METHOD FOR THE PRODUCTION OF CO-EXTRUDATES COMPOSED OF POLYSTYRENE AND OF A CROSSLINKED POLYVINYLPYRROLIDONE WITH REDUCED RESIDUAL STYRENE MONOMER CONTENT

RELATED APPLICATIONS

This application is a national stage application (under 35 U.S.C. §371) of PCT/EP2007/059435, filed Sep. 10, 2007, which claims benefit of European Application No. 06120536.5, filed Sep. 12, 2006.

The present invention relates to a method for producing co-extrudates having a decreased residual styrene monomer content obtained from polystyrene and a crosslinked polyvinylpyrrolidone polymer.

Polystyrene is frequently used in association with foods and drinks. Polystyrene is used, for example, as filter aid in drinks clarification. Blends of polystyrene and crosslinked polyvinylpyrrolidone are also used for this purpose.

However, commercially available polystyrene types customarily still have a residue monomer content in the range of a few hundred ppm.

Styrene odor can be perceived in the air in amounts of 200 to 400 ppm. In foods such as, for example, tea or fruit nectar, sensory perception of amounts as low as 0.2 ppm is possible.

To this extent, when polystyrene is used in connection with foods and drinks, sensory impairment can occur when styrene exits from the polystyrene.

WO 02/32544 describes, for example blends of polystyrene and crosslinked polyvinylpyrrolidone which are obtained by compounding in the extruder. Such co-extrudates also have a residual styrene monomer content which gives the impetus for improvements, especially since such products have a high specific surface area in the range from 2 to 8 m$^2$/g, determined by BAT measurements (biological work place tolerance values) as specified in DIN 66131.

In the case of polystyrene which is obtained by solution polymerization, styrene is customarily removed by degassing the polymer solution. In addition, the styrene content can also be lowered by degassing a polystyrene melt in the extruder.

DE 808788 describes the removal of volatile components from polystyrene and styrene copolymers by treatment with steam. The purpose of this method is to raise the softening point of the polymers.

JP-A 2002097362 describes deodorizing polyphenylene ether/polystyrene mixtures in the presence of water, with the treatment proceeding in the extruder at temperatures of >280° C. in the melt.

In addition, EP-A 377115 describes producing blends of polyphenylene ethers and polystyrenes, volatile substances such as toluene and styrene being removed by steam treatment of the pelletized blends in an extruder.

DE 19537114 describes a method for drying thermoplastic polymer powders in the melt in a mixing apparatus.

It has been found that using known methods such as water treatment of a melt in the extruder or degassing the melt, the residual monomer content cannot be decreased to the desired extent.

The international application PCT/EP 2006/060703 describes a method for lowering the residual styrene monomer content of blends of polystyrene and crosslinked polyvinylpyrrolidone by steam distillation at 100 to 120° C., or by treating an aqueous suspension of the blend in a paddle dryer. Even if the styrene content can be successfully lowered by the procedure described there, the blends thus treated have disadvantages with respect to the resultant filter resistances and wash resistances.

Customarily, filter resistances and wash resistances which exceed a defined value varying according to the technical field of use are considered unacceptable in practice. In the case of beer filtration, for example, the filter and wash resistances should as far as possible not exceed a value of 10×10$^{12}$ mPas/m$^2$.

Filter resistance designates the product of fluid viscosity and flow resistance during the build up of filtercake, wash resistance the product of fluid viscosity and flow resistance on flow through the filtercake already built up. Determination of the corresponding measured values is known to those skilled in the art and is described extensively in VDI Guideline 2726.

It was an object of the present invention to find an improved method for treating blends of polystyrene and crosslinked polyvinylpyrrolidone polymers which leads to a residual styrene monomer content which is as low as possible with simultaneously good behavior with respect to filter and wash resistances.

Accordingly, a method has been found for decreasing the residual styrene monomer content in co-extrudates of polystyrene and water-insoluble crosslinked polyvinylpyrrolidone polymers which comprises subjecting an aqueous suspension of the particulate solid co-extrudate to a heat treatment at temperatures of 60 to 99° C., the weight ratio of solid co-extrudate to water in the suspension being 1:1.5 to 1:20, and the concentration of the suspension being kept constant during the treatment.

Preferably, by means of the method according to the invention, blends are obtained having a residual monomer content of <20 mg/kg of styrene, particularly preferably <10 mg/kg, based on the total weight of the co-extrudate.

Co-extrudates are designated as mixtures of chemically different polymers which are obtained by processing the individual components together in the extruder. In the case of the present invention, the co-extrudates comprise a thermoplastic polystyrene component and a non-thermoplastic water-insoluble crosslinked polyvinylpyrrolidone, the co-extrudates not being able to be broken down into the individual components by physical methods. In the case of co-extrusion, the polyvinylpyrrolidone component is dispersed in the molten polystyrene.

As polystyrene component, all current polystyrene types come into consideration, such as standard polystyrene, impact-modified polystyrene (SB types) such as copolymers of styrene and butadiene, or high impact-modified polystyrene (HIPS types), for example polystyrene modified by polybutadiene rubber or styrene-butadiene rubber. Such polystyrenes are commercially available, for example as PS 158 k, PS 486 M or Styrolux® (BASF). In addition, use can be made of anionically polymerized polystyrene.

According to the invention the co-extrudates, in addition to the polystyrene component, as second polymer component comprise water-insoluble crosslinked polyvinylpyrrolidone polymers which are not gel-forming on water absorption and are also termed in the literature popcorn polymers (cf. J. W. Breitenbach, Chimia, Vol. 21, pp. 449-488, 1976). In pharmacopeias such as USP or Ph. Eur., such polymers are known as crospovidones. Such polymers have a porous structure and are rich in cavities. The polymers are, as stated, also not-gel-forming on water absorption. The swelling volume of such polymers in water at 20° C. is customarily in the range of 2 to 10 l/kg, preferably 4 to 8 l/kg.

The production of popcorn polymers is known per se. Whether polymerization leads to popcorn polymers instead of vitreous polymers is mainly influenced by the process procedure. Suitable methods for producing popcorn polymers in the context of the present invention are described, for example, in EP-B 88964.

Popcorn polymers are, as stated, crosslinked polymers. Crosslinking can take place either physically or chemically. Chemical crosslinkers are generally compounds which comprise at least two ethylenically unsaturated non-conjugated double bonds in the molecule and therefore act as difunctional crosslinkers in the polymerization. Preferred representatives are, for example, alkylenebisacrylamides such as methylenebisacrylamide and N,N'-acryloylethylenediamine, N,N'-divinylethyleneurea, N,N'-divinylpropyleneurea, ethylidene-bis-3-(N-vinylpyrrolidone), N,N'-divinylimidazolyl (2,2')butane and 1,1'-bis(3,3')vinylbenzimidazo-lith-2-one)-1,4-butane. Further suitable crosslinkers are, for example, alkylene glycol di(meth)acrylates such as ethylene glycol diacrylate, ethylene glycol dimethacrylate, tetraethylene glycol diacrylate, tetraethylene glycol dimethacrylate, diethylene glycol diacrylate, diethylene glycol dimethacrylate, aromatic divinyl compounds such as divinylbenzene and divinyltoluene and also vinyl acrylate, allyl acrylate, allyl methacrylate, divinyldioxane, pentaerythritol triallylether, triallylamines and also mixtures of the crosslinkers. Particularly preferred crosslinkers are ethylene glycol diacrylate, ethylene glycol dimethacrylate, N,N'-divinylethyleneurea (DVEH) and divinylbenzene (DVB).

The crosslinkers are used in amounts of 0 to 10% by weight, preferably 1 to 8% by weight, very preferably 0.2 to 5% by weight, based on the total amount of the polymer.

Such crospovidones are commercially obtainable, for example as Divergan® types, BASF or Polyplasdone® types, ISP.

Popcorn polymers generally have particle sizes from 15 µm to 1500 µm.

The polymer blends are, as already explained, preferably obtained by compounding in the extruder, that is to say by co-extrusion of the polystyrene with the crosslinked polymer. In the compounding, the non-thermoplastic popcorn polymer is dispersed in the melt of the thermoplastic polystyrene. Processing is performed at temperatures which are above the glass transition temperature of the polystyrene component, but below the decomposition temperature of the popcorn polymer. Customarily, the co-extrudates are obtained at barrel temperatures of 180 to 220° C. Preferably, the processing proceeds in a double-screw extruder. The co-extrusion can also proceed in the presence of up to 10% by weight, based on the total amount of the polymers, of water. The resultant granular co-extrudates can be ground in an additional step to give powders. Preferably, in the filtration, mixtures of blends having different mean particle sizes are used.

The co-extrudates, before the treatment by the method of the invention, customarily have residual monomer contents of 100 to 500 ppm of styrene.

The treatment according to the method of the invention is performed in such a manner that during the treatment the particulate state of the co-extrudates is retained. The co-extrudates are not melted, but remain in a particulate solid state.

The heat treatment for removing the residual monomer is carried out on an agitated suspension. The suspension can be kept in motion, for example using an agitator, so that during the treatment the material to be treated is mixed. Suitable agitators are, for example, anchor agitators, straight-arm puddle agitators, propeller agitators, disc agitators, impeller agitators, cross-arm puddle agitators, vane agitators, pitched-blade agitators, gate agitators, helical agitators, toothed-disc agitators and turbine agitators and the like.

In addition, the suspension can be kept in motion by passing inert gas streams through it.

To carry out the removal of residual monomer, the co-extrudates are mixed in a suitable vessel, preferably a stirred tank, with water in a ratio of co-extrudates to water of 1:1.5 to 1:20, preferably 1:2.3 to 1:4 (polymer:water [kg:kg]).

As water, use can be made of, for example tap water, demineralized water or twice-distilled water.

The resultant aqueous suspension is subjected to a heat treatment, as a result of which evaporation or vaporization of water from the suspension occurs. The heat treatment is performed in such a manner that the internal temperature, that is the temperature of the aqueous suspension, is 60 to 99° C., preferably 80 to 95° C.

The internal temperature can be maintained in various ways, for example by heating the apparatus walls. In addition, steam can be passed into the suspension or an inert gas stream the temperature of which can be set in such a manner that the desired internal temperature is maintained. Suitable inert gases are, for example, nitrogen, air or argon.

The evaporating/vaporizing water is customarily condensed again outside the stirred tank. The concentration of the suspension, however, is kept constant. Constant in this context means that the concentration varies by no more than +/−10% by weight from the original concentration. The concentration is kept constant by targeted feed of water. This can be a feed of fresh water or else partial or complete recycling of the water which is distilled off. The concentration can also be kept constant by targeted introduction of steam.

Preferably, the heat treatment is performed in the presence of a steam or inert gas stream which is passed through the suspension. Suitable inert gases are the abovementioned gases.

In the treatment, the pressure in the apparatus is selected in such a manner that an absolute pressure from 0.02 MPa to 0.11 MPa is present.

After the treatment, the co-extrudates can be separated off from the water by filtration and subsequently dried, if appropriate under vacuum, at temperatures of up to 100° C. If the treatment is used for finely divided pulverulent co-extrudates, after the treatment the aqueous suspension of the co-extrudates can be dried directly without a filtration step by means of spray drying.

The duration of treatment depends on the temperature selected and on the amount of co-extrudate to be treated. Customarily the treatment time is in the range of from a plurality of hours to at least 30 min, preferably at least 1 hour. To maintain the filter properties of the material used it is advantageous that the treatment time is less than 10 hours, preferably less than 8 hours.

Preferably, the treatment proceeds in the batch method. However, use can also be made, for example, of a stirred-tank cascade.

In the treatment, the co-extrudates are present in the aqueous suspension as discrete particles. Even if the treatment temperature is in part, depending on the type of polystyrene component, in the range of the glass transition temperature of the polystyrene component of the co-extrudate, customarily no melt is formed, so that the particle size distribution of the co-extrudate is retained.

The residual monomer content of the co-extrudates obtained by the method of the invention is <10 ppm (<10 mg/kg).

Surprisingly, the co-extrudates of polystyrene and crospovidones may be treated by the method of the invention without impairment of morphology and stability of the co-extrudates occurring. In view of the ability of the crosslinked polymer component to absorb water and in part to develop a considerable swelling pressure, those skilled in the art would actually have expected separation of the co-extrudate and destruction of the cavity structure.

Owing to the very low residual monomer content of <10 ppm, the co-extrudates obtained by the method of the invention are outstandingly suitable for use in connection with foods and drinks, for example as filter aids in the treatment of drinks such as fruit juices, beer, wine and sparkling wines, tea products, or other methods for the adsorption of unwanted components from foods and drinks.

The particular advantage of the method of the invention is that the treatment has no adverse effects on the filter resistances resulting in the filtration.

EXAMPLES

Residual styrene was determined using the following method:

The analytical sample was dissolved in N,N-dimethylacetamide (DMAA) and analyzed by headspace gas chromatography. The gas-chromatographic separation proceeded on a fused-silica capillary having a film of polydimethylsiloxane. For detection, a flame ionization detector was used. It was quantified by the method of standard additions. In this manner the residual content of styrene W, based on the wet sample, was determined. To obtain the residual styrene value based on the solid, the calculation took into account the solids content [FG]:

a) residual styrene [mg/kg]=FG×W/FG

For the polymer blends, the residual styrene can be calculated based on polystyrene fraction. In the examples hereinafter the polystyrene fraction in the polymer blend is 70%:

b) residual styrene based on polystyrene [mg/kg]=residual styrene (a)/polystyrene fraction The co-extrudates used in the examples hereinafter were obtained by co-extrusion of 70% by weight polystyrene PS 158K and 30% by weight crospovidones, based on the total amount of polymer in the co-extrudate.

The mean particle size distribution (X50) was determined using a Malvern Mastersizer.

The filter and wash resistances were determined according to VDI Guideline 2726.

Example 1

3000 g of demineralized water were charged into a heatable 5 liter laboratory stirred tank equipped with a straight-arm paddle agitator and 1100 g of particulate co-extrudate (X50: 46 µm) having a styrene content of 150 ppm were stirred in. The agitator speed was 500 rpm.

The wall of the stirred tank is heated with heat carrier oil at 115° C. Steam of a temperature of 122° C. was introduced into the stirred suspension at 0.8 kg/h. During the process the temperature of the suspension is 95° C. The amount of water vaporized off from the stirred tank (approximately 0.8 kg/h) was condensed in a condenser downstream of the stirred tank. The level in the stirred tank was kept constant by regular replenishment with fresh heated water. After 3 hours a styrene content of 4 ppm was reached in the Crosspure.

The aqueous co-extrudate suspension was dried in a laboratory spraying tower at gas inlet temperatures in the region of 140° C. and gas outlet temperatures in the region of 70° C. to a residual moisture <5% by weight of water.

No change in particle size distribution based on the product used was observed.

Example 2

3000 g of twice-distilled water were charged into a heatable 5 liter laboratory stirred tank equipped with a straight-arm paddle agitator and 1100 g of particulate polymer blend (X50: 44 µm) having a styrene content of 150 ppm were stirred in. The agitator speed was 600 rpm.

The wall of the stirred tank was heated with heat carrier oil at 110° C. Air was introduced as inert gas of a temperature of 115° C. into the stirred suspension at 0.4 m³/h. During the process the temperature of the suspension is 80° C. The amount of water vaporized off from the stirred tank (approximately 0.3 kg/h) was condensed in a condenser downstream of the stirred tank. The level in the stirred tank was kept constant by regular replenishment with fresh heated water. After 7 hours a styrene content of 2 ppm was achieved in the co-extrudate.

The aqueous co-extrudate suspension was dried in a laboratory spraying tower at gas inlet temperatures in the region of 140° C. and gas outlet temperatures in the region of 70° C. to a residual moisture <5% by weight of water.

No change in the particle size distribution based on the product used was observed.

Example 3

3000 g of demineralized water were charged into a heatable 5 liter laboratory stirred tank equipped with a straight-arm paddle agitator and 1100 g of particulate polymer blends (X50: 30 µm) having a styrene content of 170 ppm were stirred in. The agitator speed was 450 rpm.

The wall of the stirred tank was heated with heat carrier oil at 115° C. Air was introduced into the stirred suspension at 0.6 m³/h at a temperature in the region of 100° C. During the process the temperature of the suspension is 88° C. The amount of water vaporized off from the stirred tank in the region of 0.4 kg/h was condensed in a condenser downstream of the stirred tank. The level in the stirred tank was kept constant by regular replenishment with fresh water heated to suspension temperature. After 5 hours a styrene content of 4 ppm was achieved in the co-extrudate.

The aqueous co-extrudate suspension was dried in a laboratory spraying tower at gas inlet temperatures in the region of 140° C. and gas outlet temperatures in the region of 70° C. to a residual moisture <5% by weight of water.

No change in particle size distribution based on the product used was observed.

Example 4

3000 g of water were charged into a heatable 5 liter laboratory stirred tank and 1100 g of particulate polymer blend (X50: 30 µm) having a styrene content of 170 ppm were stirred in.

The agitator speed is 550 rpm.

The wall of the stirred tank was heated with heat carrier oil at 100° C. Steam of a temperature in the region of 105° C. was introduced into the stirred suspension at 0.5 kg/h. During the process the temperature of the suspension is 91° C. The amount of water vaporized off from the stirred tank (approximately 0.45 kg/h) was condensed in a condenser downstream of the stirred tank. The level in the stirred tank was kept constant by regular replenishment with fresh water heated to suspension temperature. After 5 hours a styrene content of 2 ppm was achieved in the co-extrudate.

The aqueous suspension was dried in a laboratory spraying tower at gas inlet temperatures in the region of 140° C. and gas outlet temperatures in the region of 70° C. to a residual moisture <5% by weight of water.

No change in the particle size distribution based on the product used was observed.

Use examples: Filtration of unfiltered beer
Filter resistance: F–W
Wash resistance: W–W

| Example | F-W [mPas/m²] before treatment | W-W [mPas/m²] before treatment | F-W [mPas/m²] after treatment according to the example | W-W [mPas/m²] after treatment according to the example |
|---|---|---|---|---|
| 1 | $1.92 \times 10^{12}$ | $1.82 \times 10^{12}$ | $4.45 \times 10^{12}$ | $4.48 \times 10^{12}$ |
| 2 | $1.92 \times 10^{12}$ | $1.82 \times 10^{12}$ | $6.71 \times 10^{12}$ | $6.36 \times 10^{12}$ |
| 3 | $4.80 \times 10^{12}$ | $5.00 \times 10^{12}$ | $3.61 \times 10^{12}$ | $3.70 \times 10^{12}$ |
| 4 | $4.80 \times 10^{12}$ | $5.00 \times 10^{12}$ | $6.60 \times 10^{12}$ | $6.60 \times 10^{12}$ |

The mixture of
27.5% by weight polymer blend from Example 3
27.5% by weight polymer blend from Example 4
22.5% by weight polymer blend from Example 1
22.5% by weight polymer blend from Example 2
displayed the following properties:
Filter resistance: $4.58 \, 10^{12}$ mPaS/m²
Wash resistance: $4.54 \, 10^{12}$ mPaS/m²
Beer filtration was carried out using a material according to this mixture The filtration action was determined on unfiltered beer (EBC value: 108 (125° C.), 72.9 (90° C.)). The examination was carried out as precoat filtration using a pilot candle filter (gap width 70 μm, filter area 0.032 m², throughput 15 l/h, area-specific throughput in the range of 470 l/(m²h). (The filtrate is taken to be clear when the EBC value is less than 1). In addition, the flow rate was measured. It was found that the material has just as good a filtration action as kieselgur. The EBC value for the resultant filtrate was 2.08 (25° C.) and 0.68 (90° C.).

In addition, the flow rate was measured. The pressure course during the filtration is shown in the FIGURE.

The invention claimed is:

1. A method for removing residual styrene monomers from a particulate solid co-extrudate comprising polystyrene and water-insoluble, crosslinked polyvinylpyrrolidone, said method comprising subjecting an aqueous suspension of said particulate solid co-extrudate to a heat treatment at a temperature in the range of from 60 to 99° C., wherein the weight ratio of said particulate solid co-extrudate to water in said aqueous suspension is from 1:1.5 to 1:20 and wherein the concentration of said aqueous suspension is kept constant during said heat treatment.

2. The method of claim 1, wherein said heat treatment is carried out in the presence of steam.

3. The method of claim 1, wherein said heat treatment is performed in the presence of an inert gas.

4. The method of claim 1, wherein the weight ratio of particulate solid co-extrudate to water in said aqueous suspension is from 1:2.3 to 1:4.

5. The method of claim 1, wherein said heat treatment is carried out at a temperature in the range of from 80 to 95° C.

6. The method of claim 1, wherein said particulate solid co-extrudate is separated off by filtration and dried subsequent to said heat treatment.

7. The method of claim 1, wherein said particulate solid co-extrudate is a pulverulent co-extrudate obtained by spray drying subsequent to the heat treatment.

8. The method of claim 1, wherein said particulate solid co-extrudate comprises from 50 to 90% by weight of a polystyrene and from 10 to 50% by weight of a water-insoluble crosslinked polyvinylpyrrolidone.

9. The method of claim 1, wherein the polystyrene of said particulate solid co-extrudate is standard polystyrene, rubber-modified high impact polystyrene, or a styrene-butadiene copolymer.

* * * * *